United States Patent [19]

Russo et al.

[11] Patent Number: 4,775,552

[45] Date of Patent: Oct. 4, 1988

[54] NEBULIZABLE COATING COMPOSITIONS FOR PRODUCING HIGH QUALITY, HIGH PERFORMANCE FLUORINE-DOPED TIN OXIDE COATINGS

[75] Inventors: David A. Russo, Edison, N.J.; Georg H. Lindner, Vlissingen, Netherlands

[73] Assignee: M&T Chemicals Inc., Woodbridge, N.J.

[21] Appl. No.: 29,826

[22] Filed: Mar. 24, 1987

Related U.S. Application Data

[63] Continuation-in-part of Ser. No. 941,493, Dec. 15, 1986, abandoned, which is a continuation-in-part of Ser. No. 828,936, Feb. 12, 1986, abandoned, which is a continuation-in-part of Ser. No. 784,279, Oct. 4, 1985, Pat. No. 4,601,917, which is a continuation-in-part of Ser. No. 705,595, Feb. 26, 1985, abandoned, which is a continuation-in-part of Ser. No. 687,065, Dec. 28, 1984, abandoned, which is a continuation-in-part of Ser. No. 598,623, Apr. 10, 1984, abandoned.

[51] Int. Cl.[4] .......................... B05D 7/22; B05D 5/12; C03C 17/245

[52] U.S. Cl. .................. 427/110; 106/287.19; 427/160; 427/168; 427/314

[58] Field of Search .................. 106/287.19; 421/168, 421/110, 314, 166

[56] References Cited

U.S. PATENT DOCUMENTS

| | | | |
|---|---|---|---|
| 4,263,335 | 4/1981 | Wagner et al. | 427/110 |
| 4,293,594 | 10/1981 | Yoldas et al. | 427/107 |
| 4,548,836 | 10/1985 | Middleton et al. | 427/160 |
| 4,584,208 | 4/1986 | Hargreaves et al. | 427/160 |

Primary Examiner—Janyce A. Bell
Attorney, Agent, or Firm—S. A. Marcus; W. Katz

[57] ABSTRACT

Improved nebulizable coating compositions for making high quality, fluorine-doped tin oxide coatings having a low sheet resistance and high visible light transmission includes a mixture of less than 95 wt. % of monobutyltin trichloride, less than 50 wt. % of an inorganic fluorine dopant, which is ammonium fluoride, ammonium bifluoride or dibutyltin difluoride, and the rest is a mixture of solvents.

9 Claims, No Drawings

NEBULIZABLE COATING COMPOSITIONS FOR PRODUCING HIGH QUALITY, HIGH PERFORMANCE FLUORINE-DOPED TIN OXIDE COATINGS

CROSS-REFERENCE TO RELATED APPLICATIONS

This application is a continuation-in-part of co-pending U.S. Ser. No. 941,493, filed 12-15-86, now abandoned which was a continuation-in-part of Ser. No. 828,936, filed Feb. 12, 1986, now abandoned which was a continuation-in-part of U.S. Ser. No. 784,279, filed Oct. 4, 1985, now U.S. Pat. No. 4,601,917 which was a continuation-in-part of U.S. Ser. No. 705,595 filed Feb. 26, 1985, and now abandoned; which was a continuation-in-part of U.S. Ser. No. 687,065, filed Dec. 28, 1984 and now abandoned; which was a continuation-in-part of U.S. Ser. No. 598,623, filed Apr. 10, 1984 and now abandoned.

BACKGROUND OF THE INVENTION

1. Field of the Invention

This invention relates to fluorine-doped tin oxide coatings, and more particularly, to nebulizable coating compositions for producing high quality fluorine-doped tin oxide coatings having a low sheet resistance and high visible light transmission.

2. Description of the Prior Art

Fluorine-doped tin oxide coatings are known to impart useful properties to many different substrate surfaces, including glass, ceramics, metals and elemental filaments. Such coated substrates find use as heat reflective elements, in energy efficient windows and in opto-electronic and semiconductor devices.

Several methods have been described in the literature to make such tin oxide coatings, including solution spray, chemical vapor deposition and ion sputtering. See, for example, U.S. Pat. Nos. 2,566,346; 3,677,814; 3,759,743; 3,949,146; 4,130,673; 4,265,974; 4,293,594; 4,325,988; 4,389,238; and 4,500,567; British Pat. No. 705,934, German Pat. No. 3,010,077 (1980); Japan Kokai No. 75 61 415 (1975); Japan Kokai No. 75 61 416 (1975); Japan Kokai No. 75 61695 (1975); and U.S.S.R. No. 142,000.

These methods all suffer from one or more disadvantages in that the process conditions, or compositions used, or the properties of the resulting tin oxide coatings, are not entirely satisfactory for forming low sheet resistant coatings from monobutyltin trichloride. Where the product is an energy efficient window, for example, success has been limited by the relatively high sheet resistance and low visible transparency of the coatings, or by the cost of the process.

Accordingly, it is an object of this invention to provide an improved method for forming high quality, high performance fluorine-doped tin oxide coatings.

A particular object herein is to provide a nebulizable coating composition for the production of high quality, high performance fluorine-doped tin oxide coatings.

Still another object herein is to provide a nebulizable coating composition which includes monobutyltin trichloride and an inorganic fluorine dopant, and an organic solvent, in predetermined concentration ranges, form which fluorine-doped tin oxide coatings which have a low sheet resistance and high visible transparency may be made.

SUMMARY OF THE INVENTION

Improved nebulizable coating compositions for making high quality, fluorine-doped tin oxide coatings having a low sheet resistance and high visible light transmission includes suitably a mixture of less than 95 wt. % of monobutyltin trichloride and less than 50 wt. % of an inorganic fluorine dopant, which is ammonium fluoride, ammonium bifluoride or dibutyltin difluoride, the rest being a mixture of solvents, preferably water and an organic solvent, preferably methanol, for ammonium fluoride and ammonium bifluoride dopants and a trialkylamine and an organic solvent, when dibutyltin bifluoride is the dopant.

DETAILED DESCRIPTION OF THE INVENTION

Air under controlled pressure and flow is passed separately through a gas dryer and a water trap, combined, and then passed through an in-line hygrometer. This air of known water content then is passed through an electric heater and into an expansion chamber.

The doped composition is nebulized by an ultrasonic generator into a fine mist with a droplet size of 10 microns or less at a constant rate. A low velocity stream of carrier gas (air, nitrogen or oxygen) then is passed into the generator to transport the mist into the hot air stream.

The heated mixture of air, water vapor and doped monobutyltin trichloride composition then is passed through a vertical tube enclosed in a hot air insulated tube and impinged on a glass slide heated to 400° to 700° C., preferably 500° to 650° C.

The novel doped monobutyltin trichloride compositions are deposited on the glass substrate by the nebulized solution method. The monobutyltin trichloride content of the solids portion of the solution suitable is less than 95%, based on the weight of the solution, which includes a mixture of solvents. The dopants are ammonium fluoride, ammonium bifluoride or dibutyltin difluoride.

Any organic solvent which is a solvent for monobutyltin trichloride may be used. Illustrative examples of suitable solvents are alcohols, such as, methanol and isopropyl alcohol, and ketones, such as methyl ethyl ketone.

The concentration of the inorganic fluorine dopant for suitably is less than 50% of the solids portion of the solution.

Preferably the air temperature ranges from about 100° C. to about 400° C., with the most preferred range being about 200° C. to about 350° C. The relative humidity ranges from 0–100%, preferably 6 to 100%, at 18° C. Air velocities range from about 2 to about 60 l/min., with the preferred range being about 5 to about 20 l/min. The mist carrier gas velocities range from about 0.5 to about 5 l/min., with the preferred range being about 1 to about 2 l/min.

The sheet resistance (ohms/sq) of the tin oxide film is measured with a conventional four point probe according to ASTM standard method F374-81.

The film thickness (A) is measured by the beta-backscatter method according to British Standards Institution method BS5411: Part 12, 1981, ISO 3544-1981.

The % infrared reflectivity is measured by a specular reflectance technique described by J. Stewart in "Infrared Spectroscopy", Marcel Dekker, Inc., N.Y. 1970 p. 539 ff. The visible transmittance is measured on a UV/vis spectrophotometer over the 400-800 nm region, versus air the the % T$_{vis}$ is averaged over the wavelengths.

The bulk conductivity was determined from the sheet resistance and the film thickness according to the well known relationship.

$$\sigma = \frac{1}{R \cdot t}$$

where $\sigma$ equals conductivity in (ohm cm)$^{-1}$
R equals sheet resistance in ohms/sq.
t equals film thickness in centimeters.

Films prepared according to the preferred embodiments of the invention have infrared reflectivities greater than 70% at the conventional 10 micron wavelength of light which is characteristic of infrared radiation at room temperature, visible transmittance of 80% or greater sheet resistances <40 ohm/sq. and conductivities greater than 1250 (ohm cm)$^{-1}$ for films 1600-2500 nm thick. The films show a very light orange color in transmitted light and a light blue iridescence in reflected light.

EXAMPLES 1-3

Examples 1-3 were carried out with nebulizable coating compositions containing monobutyltin trichloride and an inorganic fluoride as active components, using water or triethylamine, and methanol, as co-solvents, in suitable composition ranges. The results show that low sheet resistance doped tin oxide layers were formed.

TABLE

| Example No. Active Coating Composition (% by wt) | 1* 30% DBTF 70% MBTC | 2** 20% ABF 80% MBTC | 3** 20% AF 80% MBTC | A*** 100% MBTC |
|---|---|---|---|---|
| Temperature of carrier air (°C.) | 260-280 | 260-280 | 260-280 | 260-280 |
| Flow rate of carrier air (l/min) | 10 | 10 | 10 | 10 |
| Relative humidity of air (%) | 6 | 6 | 6 | 6 |
| Temperature of heating block (°C.) | 650 | 650 | 650 | 650 |
| Sheet resistance R (ohm/sq) | 32 | 19 | 26 | 295 |
| Film thickness (nm) | 215 | 249 | 216 | 237 |
| Conductivity (ohm cm)$^{-1}$ | 1459 | 2114 | 1781 | 143 |

Examples 1-3
DBTF = Dibutyltin difluoride
ABF = Ammonium bifluoride
AF = Ammonium fluoride
MBTC = Monobutyltin trichloride
*30% of mixture in 0.6 equivalent of triethylamine for each equivalent of DBTF; the rest being methanol.
**30% of mixture in 9 parts of water for each 10 parts of fluoride, the rest being methanol.
***30% in methanol.

What is claimed is:

1. A nebulizable coating compositions for making high quality fluorine-doped tin oxide coatings having a low sheet resistance and high visible light transmission comprising:
   (a) a mixture comprising
      (1) less than 95 wt. % of monobutyltin trichloride, and
      (2) less than 50 wt. % of an inorganic fluorine dopant, which is selected from ammonium fluoride, ammonium bifluoride and dibutyltin difluoride, and,
   (b) the rest being a solvent mixture of water or a trialkylamine, and an organic solvent.

2. A nebulizable coating composition according to claim 1 in which said organic solvent is methanol.

3. A nebulizable coating oomposition according to claim 1 in which said inorganic fluorine dopant is ammonium fluoride or ammonium bifluoride and said solvent mixture is water and methanol.

4. A nebulizable coating composition according to claim 1 in which said inorganic dopant is dibutyltin difluoride and said mixture of solvents is a trialkylamine and methanol.

5. A method of depositing a high quality fluorine-doped tin oxide coating having a low sheet resistance and high visible light transmission comprising:
   (a) forming a nebulizable coating composition of claim 1, and
   (b) contacting said composition in an oxygencontaining gas stream with a substrate maintained at a temperature of about 400° to 700° C.

6. A method according to claim 5 in which said oxygen-containing gas stream is air.

7. A method according to claim 5 where said temperature of 500°-650° C.

8. A method according to claim 5 where said substrate is glass.

9. A method according to claim 5 where said deposition is carried out at between 6% to 100% relative humidity at 18° C.

* * * * *